(12) United States Patent
Mossoba et al.

(10) Patent No.: US 10,817,879 B2
(45) Date of Patent: Oct. 27, 2020

(54) FRAUD DETECTION BASED ON AN ANALYSIS OF MESSAGES IN A MESSAGING ACCOUNT

(71) Applicant: Capital One Services, LLC, McLean, VA (US)

(72) Inventors: Michael Mossoba, Arlington, VA (US); Joshua Edwards, Philadelphia, PA (US); Abdelkadar M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 138 days.

(21) Appl. No.: 16/241,580

(22) Filed: Jan. 7, 2019

(65) Prior Publication Data

US 2020/0219105 A1 Jul. 9, 2020

(51) Int. Cl.
*G06Q 20/40* (2012.01)
*G06Q 20/38* (2012.01)
*H04L 29/06* (2006.01)
*G06Q 30/06* (2012.01)
*G06Q 20/42* (2012.01)
*G06Q 20/04* (2012.01)

(52) U.S. Cl.
CPC ....... *G06Q 20/4016* (2013.01); *G06Q 20/047* (2020.05); *G06Q 20/382* (2013.01); *G06Q 20/405* (2013.01); *G06Q 20/42* (2013.01); *G06Q 30/06* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 6,631,411 B1 * | 10/2003 | Welter | H04L 67/22 709/224 |
| 7,403,922 B1 | 7/2008 | Lewis et al. | |
| 7,539,644 B2 | 5/2009 | Hu et al. | |
| 8,793,188 B2 | 7/2014 | Larkin | |
| 2007/0179848 A1 * | 8/2007 | Jain | G06F 16/951 705/14.27 |

(Continued)

FOREIGN PATENT DOCUMENTS

WO 2011/005900 1/2011

*Primary Examiner* — Christopher Bridges
(74) *Attorney, Agent, or Firm* — Harrity & Harrity, LLP

(57) ABSTRACT

A device may obtain a notification that a transaction occurred, where the transaction is associated with a financial account of a user, and a merchant. The device may determine that the merchant is associated with providing confirmation messages for transactions, and may process, based on determining that the merchant is associated with providing confirmation messages, one or more messages in a messaging account associated with the user to determine whether the messaging account includes a confirmation message associated with the transaction. The device may determine that the messaging account does not include any confirmation message associated with the transaction, may determine a likelihood that the transaction was unauthorized based on the messaging account not including a confirmation message, and may perform an action associated with the financial account of the user based on the likelihood that the transaction was unauthorized.

20 Claims, 8 Drawing Sheets

(56) References Cited

U.S. PATENT DOCUMENTS

| | | | |
|---|---|---|---|
| 2013/0103473 A1* | 4/2013 | Carpenter | G06Q 30/0249 |
| | | | 705/14.17 |
| 2013/0198075 A1* | 8/2013 | Sakata | G06Q 20/382 |
| | | | 705/44 |
| 2014/0358789 A1* | 12/2014 | Boding | G06Q 20/405 |
| | | | 705/44 |
| 2015/0066772 A1* | 3/2015 | Griffin | G06Q 20/4016 |
| | | | 705/44 |
| 2017/0140174 A1* | 5/2017 | Lacey | G06Q 20/4016 |

* cited by examiner

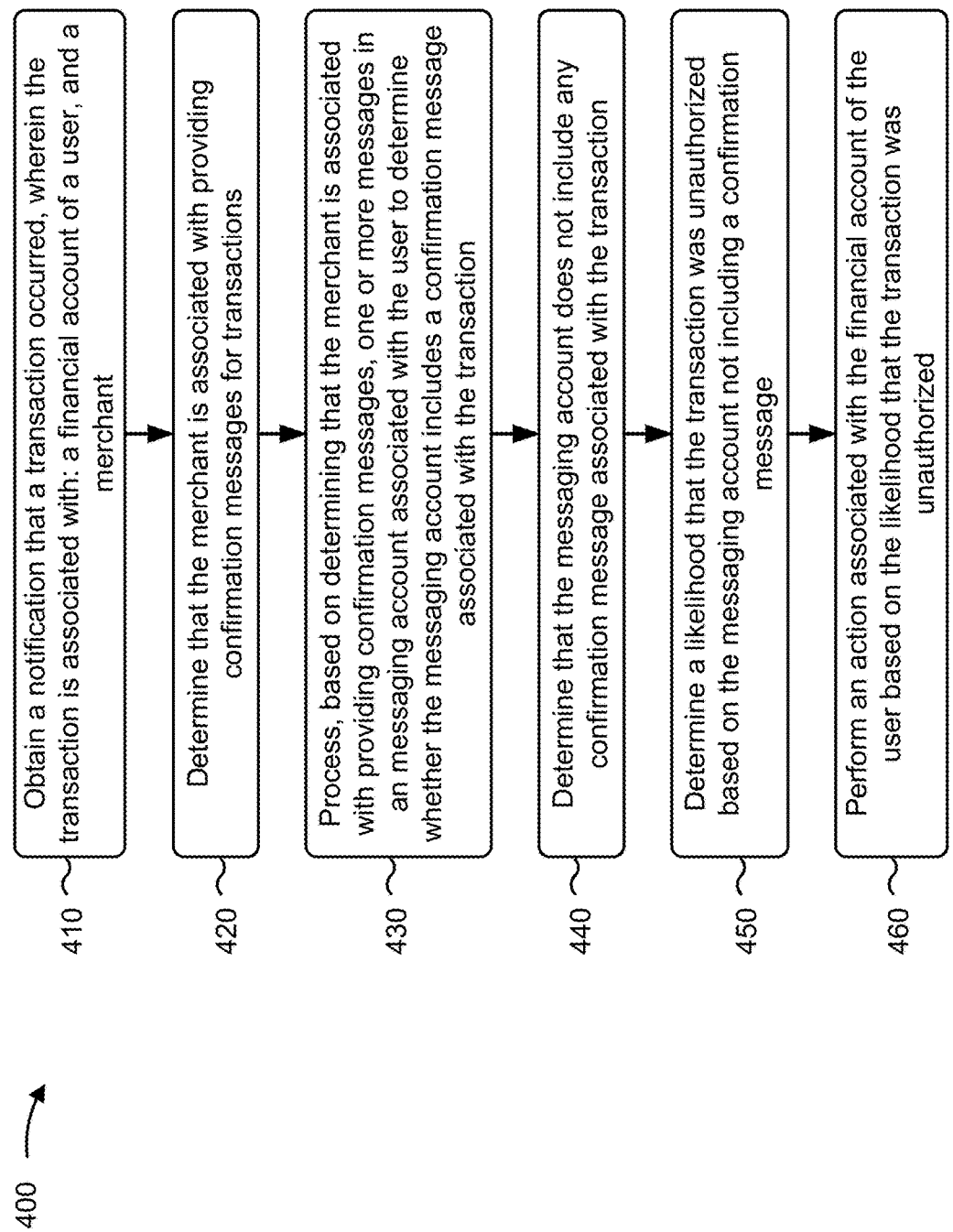

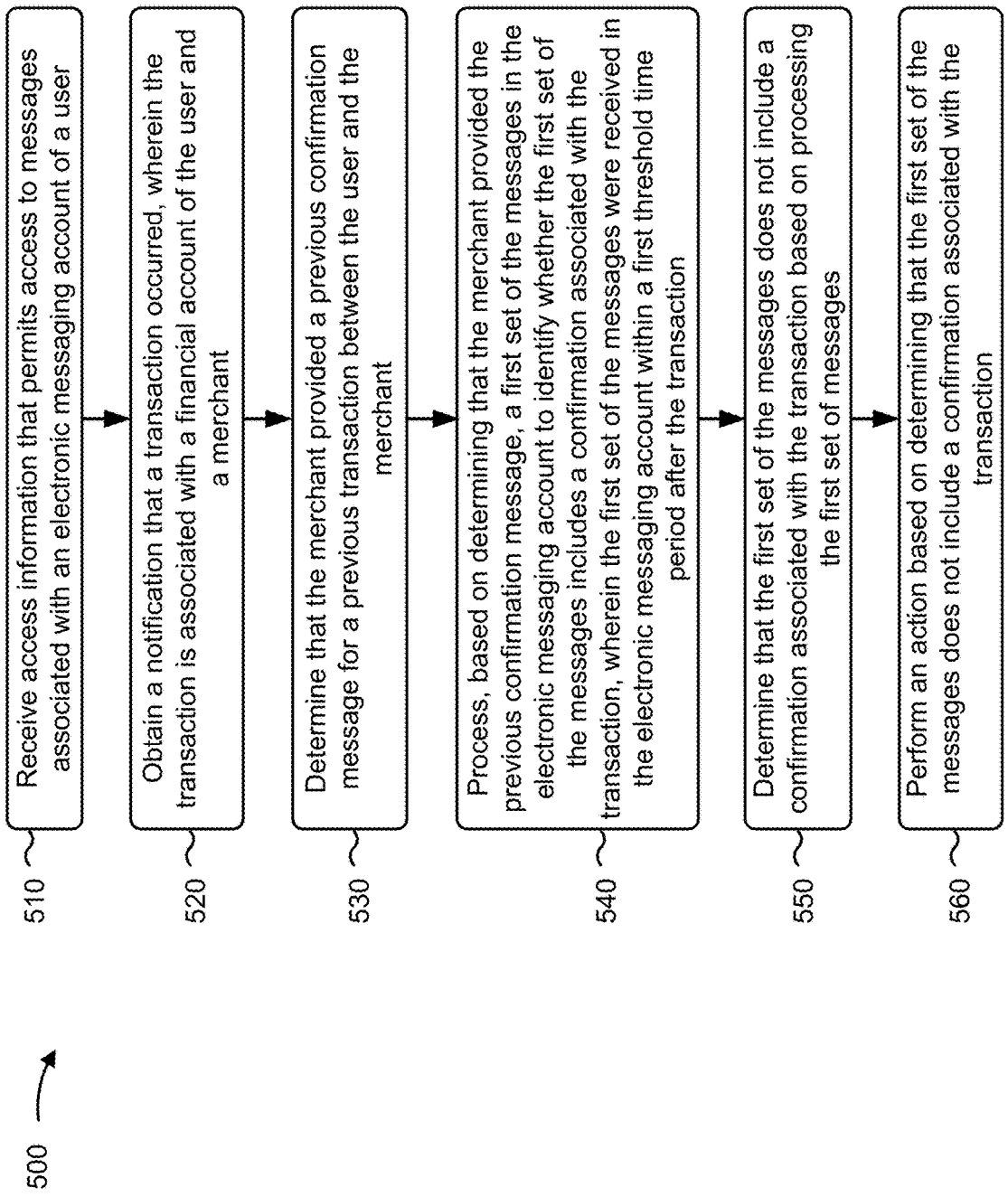

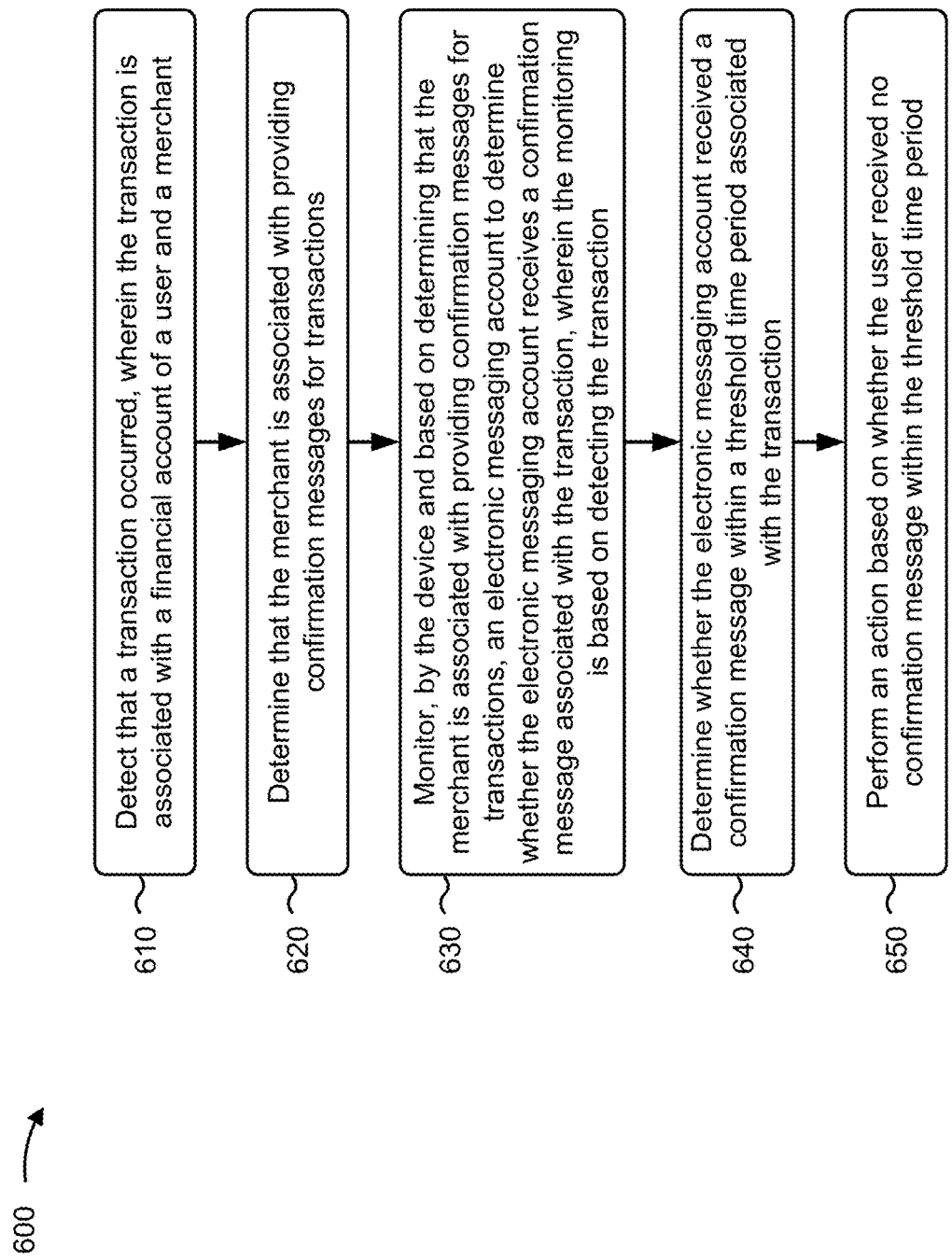

FRAUD DETECTION BASED ON AN ANALYSIS OF MESSAGES IN A MESSAGING ACCOUNT

BACKGROUND

Fraud impacts numerous businesses and consumers and affects millions of dollars in transactions. With the advancement of technology, many sophisticated methods are being used to commit fraud, while fraud detection and/or fraud analysis has been employed to combat fraud. Methods of detecting and/or analyzing fraud may include one or more data analysis techniques.

SUMMARY

According to some implementations, a device may include one or more memories, and one or more processors, communicatively coupled to the one or more memories, to obtain a notification that a transaction occurred, wherein the transaction is associated with a financial account of a user, and a merchant. The one or more processors may determine that the merchant is associated with providing confirmation messages for transactions, and may process, based on determining that the merchant is associated with providing confirmation messages, one or more messages in a messaging account associated with the user to determine whether the messaging account includes a confirmation message associated with the transaction. The one or more processors may determine that the messaging account does not include any confirmation message associated with the transaction, may determine a likelihood that the transaction was unauthorized based on the messaging account not including a confirmation message, and may perform an action associated with the financial account of the user based on the likelihood that the transaction was unauthorized.

According to some implementations, a non-transitory computer-readable medium may store instructions that include one or more instructions that, when executed by one or more processors of a device, cause the one or more processors to receive access information that permits access to messages associated with a messaging account of a user. The one or more instructions may cause the one or more processors to obtain a notification that a transaction occurred, wherein the transaction is associated with a financial account of the user and a merchant. The one or more instructions may cause the one or more processors to determine that the merchant provided a previous confirmation message for a previous transaction between the user and the merchant, and may process, based on determining that the merchant provided the previous confirmation message, a first set of the messages in the messaging account to identify whether the first set of the messages includes a confirmation associated with the transaction, wherein the first set of the messages were received in the messaging account within a first threshold time period after the transaction. The one or more instructions may cause the one or more processors to determine that the first set of the messages does not include a confirmation associated with the transaction based on processing the first set of messages and may perform an action based on determining that the first set of the messages does not include a confirmation associated with the transaction.

According to some implementations, a method may include detecting that a transaction occurred, wherein the transaction is associated with a financial account of a user and a merchant. The method may include determining that the merchant is associated with providing confirmation messages for transactions, and monitoring, based on determining that the merchant is associated with providing confirmation messages for transactions, a messaging account to determine whether the messaging account receives a confirmation message associated with the transaction, wherein the monitoring is based on detecting the transaction. The method may include determining whether the messaging account received a confirmation message within a threshold time period associated with the transaction, and performing an action based on whether the user failed to receive a confirmation message within the threshold time period.

BRIEF DESCRIPTION OF THE DRAWINGS

FIGS. 4-6 are flow charts of an example process associated with fraud detection based on an analysis of received messages associated with a user.

DETAILED DESCRIPTION

Figure 1A:
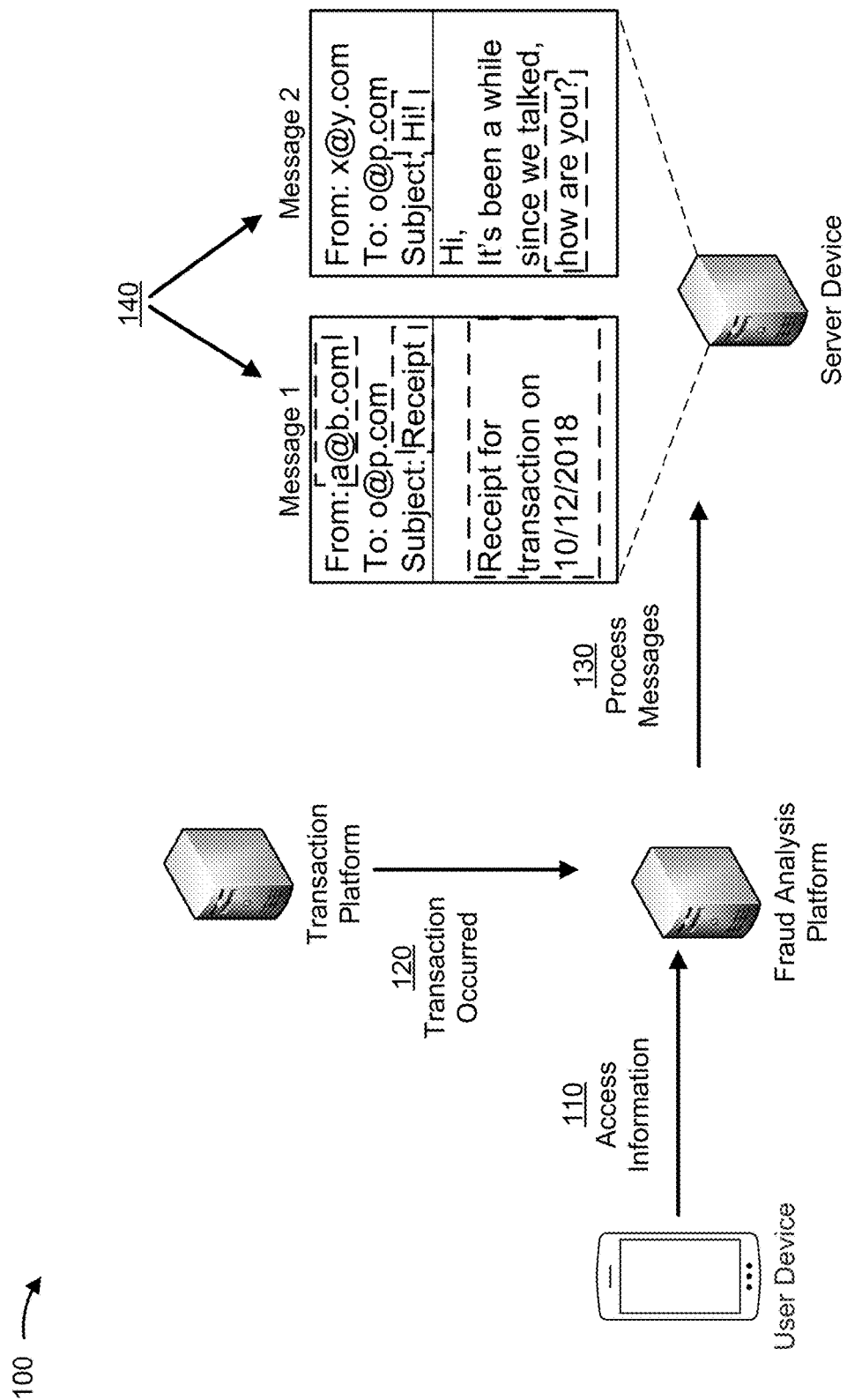
FIGS. 1A-1C are diagrams of an example implementation described herein.

The following detailed description of example implementations refers to the accompanying drawings. The same reference numbers in different drawings may identify the same or similar elements.

In some instances, a fraud analysis may be performed on a transaction associated with a financial institution (e.g., a bank, a credit union, and/or the like). For example, a financial institution may initiate a fraud analysis on a transaction associated with a financial account of the financial institution. In some instances, a fraud analysis may be performed after the transaction is completed (e.g., after the financial institution approved the transaction). In such cases, an initial fraud analysis may not have been performed while the transaction was pending (e.g., after the transaction was initiated by a customer but before the transaction was approved by the financial institution). In other cases, the transaction may have passed the initial fraud analysis (e.g., because the transaction did not appear fraudulent according to the initial fraud analysis). However, if the transaction was fraudulent, the customer and/or the financial institution may be liable for any lost funds associated with the fraudulent transaction.

In some cases, it may take days or weeks to identify that a transaction was fraudulent. However, in order to increase the chances of recovering lost funds from a fraudulent transaction, a financial institution and/or user should attempt to identify that the transaction was fraudulent as quickly as possible. As an example, a financial institution may rely on a pattern analysis of recent transactions and compare this pattern to historical transactions to identify potentially fraudulent transactions. This method of fraud analysis necessitates a delay in detecting a fraudulent transaction. First, the financial institution must wait to collect enough recent transactions to perform a pattern analysis. This may take hours, days, or weeks depending on the frequency of the transactions to gather enough data for pattern analysis. Second, the computing resources require time to perform the pattern analysis, access historical transaction data, and compare the processed recent transactions with the historical data. As more transactions are analyzed, corresponding fraud analyses for any particular transaction may be queued and delayed. This delay in the queue is proportional to how much data a computer needs to process for each transaction. Furthermore, some fraud analyses may involve complex computing systems and/or complex user interactive systems to detect fraudulent activity (e.g., based on the user detecting the fraudulent transaction in a financial statement) that receive user feedback (e.g., using a voice response system, natural language processing, and/or the like). Accordingly, previous fraud analysis techniques of completed transactions may take extended periods of time to be completed and/or performed and/or further involve relatively large amounts of data, computing resources, and/or communication resources.

In some cases, a merchant may send a confirmation message to a user after the user is involved in a transaction with the merchant. For example, the user may provide messaging account information (e.g., an email address, a telephone number, and/or the like) to the merchant to enable the merchant to provide the confirmation message to a corresponding messaging account of the user. The user may provide such messaging information during the transaction, before the transaction, through a user account associated with the merchant, and/or the like. The confirmation message may include a notification that the transaction was completed, a receipt associated with the transaction, and/or the like. Such a confirmation message is typically received within the messaging account within a relative short time period (e.g., within five minutes, within 15 minutes, within an hour, and/or the like).

However, in some cases, a merchant may not provide a confirmation message to the user when the transaction is fraudulent. For example, the transaction may have been fraudulent due to an unauthorized user gaining access to financial account information (e.g., transaction card (credit, debit, etc.) information, such as a number, an expiration date, verification information, and/or the like) and using that financial account information to make a purchase. Additionally, or alternatively, an unauthorized user may have hacked into the user account associated with the merchant, changed the messaging account information (e.g., so that the confirmation message is not sent or is sent to another messaging account), and made a purchase from the merchant using financial account information stored with the user account. Accordingly, for such fraudulent transactions involving a financial account of the user, the merchant may not provide the confirmation message to the messaging account of the user.

Some implementations described herein provide a fraud analysis platform to perform a fraud analysis that avoids waiting for a certain quantity of recent transactions, performing pattern analysis, and accessing historical transaction data may Accordingly, the fraud analysis platform may increase how quickly a fraudulent transaction can be detected by enabling the fraud analysis to be started earlier after a transaction is completed and reducing the amount of data processed to perform a fraud analysis for each transaction, relative to previous techniques. As described herein, the fraud analysis platform may determine whether a transaction involving a financial account of a user was fraudulent based on whether a messaging account associated with the user receives a confirmation message associated with the transaction. For example, based on detecting the transaction and determining that a merchant associated with the transaction typically provides confirmation messages or is capable of providing confirmation messages, the fraud analysis platform may analyze and/or monitor the messaging account (e.g., for a threshold time period after the transaction) for a confirmation message in order to determine a likelihood that the transaction was fraudulent. If the fraud analysis platform determines that the messaging account has received a confirmation message, the fraud analysis platform may determine that the transaction likely was not fraudulent. On the other hand, if the fraud analysis platform determines that the messaging account did not receive a confirmation message, the fraud analysis platform may determine that the transaction was likely fraudulent. In this way, because a confirmation message for a transaction is typically sent within a relatively short time period, the fraud analysis platform may more quickly determine a likelihood that the transaction was fraudulent and/or detect that the transaction was fraudulent, lessening the amount of data need to process a fraud analysis for a transaction, as described herein. Accordingly, the fraud analysis platform, as described herein, may increase the likelihood of a financial institution and/or a user recovering any lost funds from the fraudulent transaction relative to previous techniques. Furthermore, the fraud analysis platform may conserve computing resources and/or network resources, used to determine the likelihood that the transaction was fraudulent and/or detect that the transaction was fraudulent relative to previous techniques.

As used herein, a "merchant" may refer to any individual or organization involved in the sale or leasing of goods or services. For example, a merchant may be a trader, a retailer, a vendor, a seller, a lessor, and/or the like.

Figure 1B:
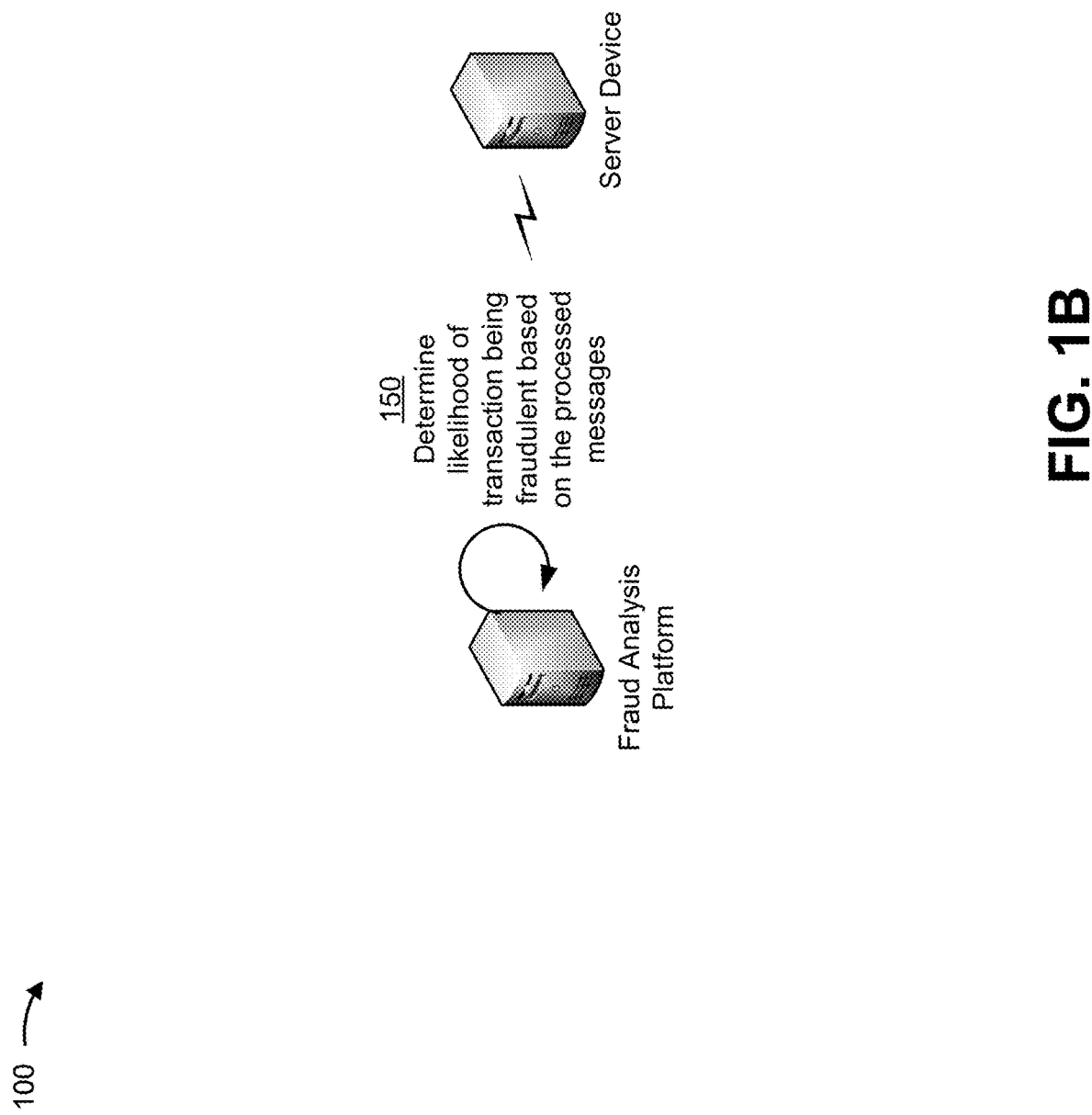
Figure 1C:
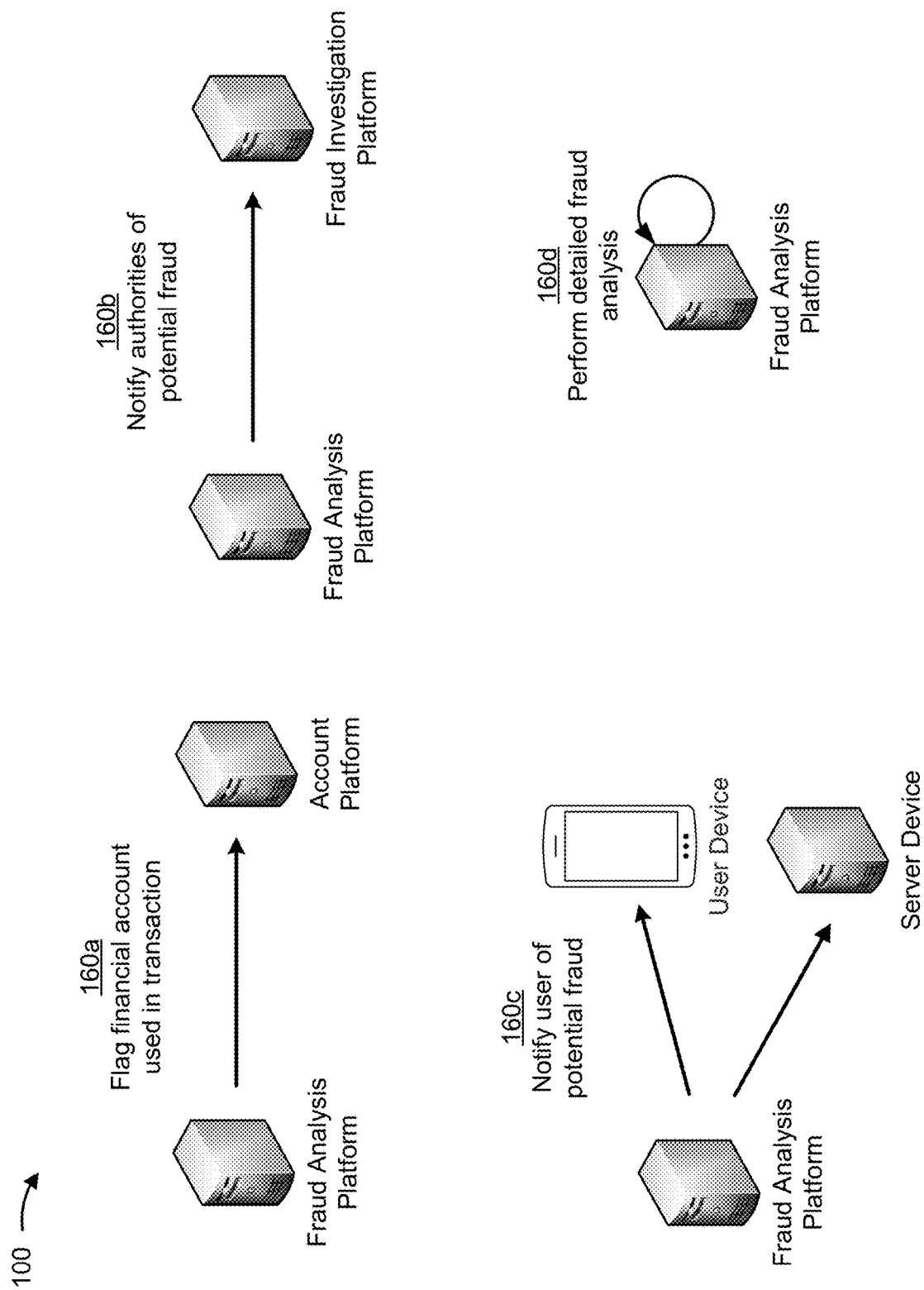

FIGS. 1A-1C are diagrams of an example implementation 100 described herein. As shown, example implementation 100 includes a user device, a transaction platform, a fraud analysis platform, and a server device.

As shown in FIG. 1A, and by reference number 110, a fraud analysis platform may receive, from the user device, access information (e.g., that permits the fraud analysis platform to access a messaging account). For example, the user device may be associated with a user, and the access information may include a set of credentials associated with a messaging account of the user, a username/password combination of the user, a security token (e.g., that provides limited access to a messaging account) associated with the user, a biometric associated with the user, and/or the like. In some implementations, a messaging account may include an email account, a text messaging account, an instant messaging account, a voice messaging account, and/or the like. In some implementations, a messaging account may be associated with messages (e.g., stored on the server device), such as email messages, text messages, instant messages, and/or the like. In some implementations, a messaging account may store hundreds, thousands, or more messages from hundreds, thousands, or more third parties, that include different types of content (e.g., personal content, transaction confirmation content, a digital coupon, an advertisement, etc.), and/or the like. As described herein, the messaging account may receive confirmation messages associated with transactions involving one or more accounts of the user (e.g., financial accounts, member accounts with merchants, and/or the like). A confirmation message may include information identifying that a transaction occurred, a receipt for the transaction, transaction information (e.g., time, date, location, merchant, and/or the like), and/or the like.

In some implementations, the fraud analysis platform may receive the access information based on requesting the access information from the user device (e.g., by providing a prompt for display via a display associated with the user device, by causing a user interface to be provided for display via the display, etc.), based on a user of the user device inputting the access information (e.g., via a user interface, via an application installed on the user device, etc.), and/or the like. In some implementations, the access information may permit the fraud analysis platform to access messages associated with a messaging account for a particular amount of time, stored in a particular folder associated with the messaging account (e.g., in an inbox folder, in a spam folder, etc.), and/or the like. In some implementations, the server device may prompt a user of the user device to permit the fraud analysis platform to access the messaging account (e.g., in a manner similar to a two-factor authentication). This increases a security of providing the fraud analysis platform with access to a messaging account by providing the fraud analysis platform with limited access to the messaging account, by providing the user of the user device with control over whether the fraud analysis platform can access the messaging account, and/or the like.

In some implementations, after receiving the access information, the fraud analysis platform may access a messaging account using the access information. For example, the fraud analysis platform may access the messaging account by logging into the messaging account (e.g., after navigating a web browser to a login page associated with the messaging account and inputting the access information to the login page), by providing the access information to the server device, and/or the like. Continuing with the previous example, the fraud analysis platform may communicate with the server device via internet message access protocol (IMAP), post office protocol (POP), a proxy authentication system, such as Open Authorization (OAuth), and/or the like.

To maintain privacy of the user associated with the messaging account, the fraud analysis platform may ensure that the user opts in (e.g., via the access information) to enabling access to the messaging account. Accordingly, the fraud analysis platform may be configured to abide by any and all applicable laws with respect to maintaining the privacy of the user and/or content of messages within the messaging account. In some implementations, the fraud analysis platform may not download any messages from the messaging account, the fraud analysis platform may anonymize and/or encrypt any private information associated with the messaging account, and/or the like. In some implementations, the fraud analysis platform may have or be configured to have limited access to the messaging account. For example, the fraud analysis platform may be configured to only have access to the messaging account for a threshold time period after the transaction (e.g., ten minutes, an hour, a day, and/or the like), to only have access to a limited number of most recently received messages (e.g., the last ten messages, twenty messages, and/or the like), to only have access to messages with certain keywords or phrases (e.g., keywords or phrases representative of a transaction, keywords or phrases representative of a merchant, and/or the like), to only have access to a particular folder of messages (e.g., a specific inbox), and/or the like.

Accordingly, the access information may indicate that a user associated with the user device has authorized the fraud analysis platform to monitor a messaging account (e.g., an email account, a text message account, an instant message account, and/or the like) which is stored and/or maintained by a server device, as shown. That access information may include information associated with the messaging account to permit the fraud analysis platform to monitor the messaging account and the fraud analysis platform may store such information, in a data structure of the fraud analysis platform, in association with the identification information associated with the user. In this way, the fraud analysis platform may receive authorization from a user to monitor a messaging account associated with a user to determine whether a confirmation message associated with the user was received.

As further shown in FIG. 1A, and by reference number 120, the fraud analysis platform receives, from a transaction platform, a notification that a transaction occurred. The transaction may involve an account (e.g., a financial account, a member account, and/or the like) associated with the user of the user device. For example, the transaction may involve a payment from a financial account of a user to an account of a merchant. The transaction may have been initiated by a user via a website (or online portal) associated with the merchant, a point of sale device at a location of the merchant, and/or the like. In some implementations, the transaction platform may be associated with the same financial institution as the fraud analysis platform.

Based on the transaction platform notifying the fraud analysis platform of the transaction, the fraud analysis platform may identify a merchant associated with the transaction. For example, the fraud analysis platform may identify the merchant based on an identifier (e.g., a name, an account number, a merchant identification number, a merchant category, and/or the like) included in a notification from the transaction platform. In some implementations, the fraud analysis platform may identify the merchant to determine whether the merchant is known to send a confirmation message to a messaging account for transactions with the merchant. In some implementations, the fraud analysis platform may determine that the merchant is known to send a confirmation message for a transaction based on information received from the merchant, based on identifying that the merchant previously provided a confirmation message to the messaging account of the user, based on identifying that the merchant previously provided a confirmation message to a messaging account of one or more other users (e.g., one or more other users associated with a financial institution of the fraud analysis platform), based on a characteristic of the merchant (e.g., based on the merchant being an online retailer, based on the type of merchant, based on the types of products and/or services offered by the merchant, and/or the like), and/or the like.

In some implementations, if the fraud analysis platform cannot determine whether the merchant is known to provide a confirmation message to a messaging account for a transaction, the fraud analysis platform may determine a probability that the merchant provides a confirmation message to a messaging account for a transaction. For example, the fraud analysis platform may use a machine learning model, such as a merchant analysis model, to determine a likelihood that the merchant will provide a confirmation message for the transaction of example implementation 100. For example, the fraud analysis platform may train the merchant analysis model based on one or more parameters associated with the merchant, such as products sold and/or services offered by the merchant, a merchant identifier associated with the merchant, an industry associated with the merchant, whether the merchant is associated with online transactions and/or in-person transactions, and/or the like. The fraud analysis platform may train (e.g., before and/or during an analysis to determine whether the merchant is known to provide a confirmation message) the machine learning model using historical data associated with the merchant and/or one or more other merchants (e.g., merchants having the same or similar characteristics as the merchant) providing a confirmation message (for a transaction) to a messaging account according to the one or more parameters. Using the historical data and the one or more parameters as inputs to the machine learning model, the fraud analysis platform may determine a probability that the merchant provided or will provide a confirmation for the transaction to the messaging account, in order to permit the fraud analysis platform to perform a fraud analysis based on whether the merchant provides a confirmation message to the messaging account.

In some implementations, the fraud analysis platform may store and/or maintain a data structure (e.g., a table, a list, a database, an index, and/or the like) of merchants that are associated with providing confirmation messages to messaging accounts of users. Such merchants may have been known to provide messages for transactions to messaging accounts or have been determined to be likely to provide messages for transactions to messaging accounts, and/or the like. The fraud analysis platform may populate and/or update the data structure based on information received from the merchant, based on identification of confirmation messages in one or more messaging accounts (e.g., in the messaging account of the user), based on the merchant analysis model, and/or the like. Accordingly, the fraud analysis platform may reference the data structure to determine whether a merchant involved in the transaction is likely to provide a confirmation message to the messaging account of the user.

In this way, based on determining that a transaction occurred and identifying that a merchant involved in the transaction may provide a confirmation message for the transaction to a messaging account, the fraud analysis platform may monitor the messaging account of the user for a confirmation message associated with the transaction.

As further shown in FIG. 1A, and by reference number 130, the fraud analysis platform may process messages in the messaging account by accessing messages associated with a messaging account (e.g., a messaging account that is hosted on the server device, messages that are stored on the server device, and/or the like). For example, the fraud analysis platform may process the messages to identify a confirmation of a transaction. As used herein, a confirmation of a transaction may include a notification that the transaction occurred, a receipt associated with a transaction, and/or the like. As used herein, a message that includes a confirmation for a transaction is referred to as a confirmation message. In some implementations, the fraud analysis platform may process hundreds, thousands, or more messages in hundreds, thousands, or more messaging accounts. In this way, the fraud analysis platform may process a set of messages that cannot be processed manually or objectively (e.g., in a consistent manner) by a human actor.

In some implementations, the fraud analysis platform may determine that a characteristic of the transaction indicates that the transaction may be fraudulent. For example, the fraud analysis platform may analyze information associated with the transaction in the notification that the transaction occurred. The information may include a characteristic (e.g., a time, a transaction location, a merchant, a product or service type, a transaction type, and/or the like) that indicates a likelihood that the transaction is fraudulent. For example, if the transaction was performed in a location that is outside of a known location of the user and/or frequented location of the user, the fraud analysis platform may determine that the transaction is likely fraudulent. In such cases, the fraud analysis platform may identify the characteristic and/or identify that the transaction is likely fraudulent (e.g., based on the characteristic), and process the messages (or monitor the messaging account), as described herein, based on identifying the characteristic and/or identifying that the transaction is likely fraudulent. On the other hand, if the fraud analysis platform determines that a transaction likely is not fraudulent (e.g., based on a threshold probability), then the fraud analysis platform may forego monitoring or processing the messages. The threshold probability may be a static threshold (e.g., 50% likely fraudulent, 75% likely fraudulent, 90% likely fraudulent, and/or the like) or a transaction specific threshold that is based one or more characteristics of the transaction. Therefore, computing resources and/or network resources that may otherwise be wasted processing messages of the messaging account can be conserved.

In some implementations, the fraud analysis platform may pre-process the messages to reduce the quantity of messages that are further processed to identify confirmation messages, for example by identifying a characteristic of the message that suggests transaction validity. The characteristics may include a source of the messages (e.g., domain name of a source of the messages, whether the source is included on a list of sources (e.g., merchants) provided by an individual or merchants, and/or the like), a folder into which the messages have been filtered by the server device hosting the messaging account (e.g., an inbox, a promotions folder, a spam folder, and/or the like), a time and/or date on which the messages were received (e.g., messages received before the time and/or date of the transaction may not be processed), and/or the like. Accordingly, the fraud analysis platform may not process messages to identify a confirmation message associated with a transaction unless the fraud analysis platform identifies a likelihood that the transaction is fraudulent based on one of the above characteristics or other characteristics of the transaction. In this way, the fraud analysis platform may conserve computing resources and/or network resources that may otherwise by consumed by processing messages that could have been filtered out as irrelevant.

Additionally, or alternatively, the fraud analysis platform may ignore messages (e.g., from third parties that are not likely to be associated with the transaction, such as personal messages, newsletters, and/or the like). For example, the fraud analysis platform may identify messages associated with a third party that may be likely to be associated with a confirmation message by performing a lookup of a domain name associated with a message, by analyzing a repository of hundreds, thousands, or more messages to determine if the same type of message was sent to other messaging accounts (e.g., indicating that the message may be from a business), by performing a lookup of a portion of a source identifier (e.g., a user identifier before the "@" symbol in an email address), and/or the like. Additionally, or alternatively, and as another example, the fraud analysis platform may analyze historical messages associated with a folder and determine a theme for the folder and may ignore messages in that folder (e.g., a folder with a personal theme, a promotional theme, and/or the like) and/or process the messages in that folder (e.g., a transaction folder, a receipt folder, and/or the like) based on the theme.

Additionally, or alternatively, the fraud analysis platform may identify terms and/or phrases included in a subject line and/or in a body of a message and may ignore messages that include particular combinations of terms and/or phrases. Additionally, or alternatively, and as another example, the fraud analysis platform may ignore duplicate messages (e.g., messages that have the same header, the same body, the same unique identifier, etc.). Such a technique conserves processing resources of the fraud analysis platform by reducing a quantity of messages that the fraud analysis platform may be required to process, by filtering messages that are unlikely to be confirmation messages, and/or the like.

In some implementations, the fraud analysis platform may process the messages using a combination of processing techniques (e.g., after pre-processing the messages) to identify messages that may be confirmation messages. For example, the fraud analysis platform may process the messages using an image processing technique (e.g., a computer vision technique, an optical character recognition (OCR) technique, etc.), a text processing technique (e.g., a natural language processing technique, a text analysis technique, etc.), a code processing technique, and/or the like.

In some implementations, when processing the messages using the image processing technique, the fraud analysis platform may process images associated with the messages. In some implementations, the fraud analysis platform may identify that a message includes an image by detecting that the message includes an image as an attachment (e.g., based on a file type of the attachment), by detecting an image in a body of the message (e.g., as compared to detecting text in the body of the message), by processing code associated with the message to detect an image (e.g., by detecting an image tag in code of an email or by detecting a unique resource identifier for an image included in the code), and/or the like. In some implementations, the fraud analysis platform may process the image to identify a term, a phrase, a logo, a symbol, and/or the like included in the image. For example, the fraud analysis platform may process the image using OCR to identify a confirmation of a transaction included in the image, a merchant with which the confirmation is associated, an amount associated with the transaction identified in the confirmation, a time associated with the transaction identified in the confirmation, a product and/or service identified in the confirmation, and/or the like.

Additionally, or alternatively, the fraud analysis platform may capture an image of the body of a message (e.g., text and images included in the body of the message), such as by saving a copy of the message as a portable data format (PDF) document or by capturing a screen shot of the message, and may process the image in a similar manner (e.g., to identify terms, phrases, logos, etc. included in the image of the body of the message). For example, the fraud analysis platform may capture an image of text of the message, images included in the message, and/or the like and may process the image to identify a confirmation of a transaction included in the message, to extract information related to the confirmation of the transaction from the message, and/or the like.

In some implementations, an image associated with the message may include one or more confirmations, a single confirmation may be comprised of multiple images, and/or the like. In some implementations, the fraud analysis platform may identify multiple confirmations in a single image. For example, when processing the image, the fraud analysis platform may identify characteristics of the image that indicate that multiple confirmations for multiple transactions are included in the image. Continuing with the previous example, the fraud analysis platform may identify each of the multiple confirmations in the image by identifying lines or boxes in the image that surround or separate the multiple confirmations in the image from each other, by identifying multiple unique identifiers in the image (e.g., serial numbers, bar code numbers, etc. of different digital coupons), by identifying multiple different bar codes, QR codes, and/or the like in the image (e.g., corresponding to multiple different confirmations), by identifying repeating terms and/or phrases in the image (e.g., multiple transaction dates associated with corresponding transactions), and/or the like.

In some implementations, when processing the messages using the text processing technique, the fraud analysis platform may process text of the message to identify terms, phrases, and/or the like included in the text (e.g., to identify confirmations included in the text, to extract information related to the confirmations, etc.). For example, the fraud analysis platform may process the text of the messages to identify terms and/or phrases that may be likely related to a confirmation, that identify a merchant with which a confirmation is likely to be associated, and/or the like.

In some implementations, when processing the messages using the code processing technique, the fraud analysis platform may process code associated with the messages to identify a confirmation included in the messages, to identify information related to the confirmation, and/or the like. For example, the fraud analysis platform may analyze code (e.g., hypertext markup language (HTML) code, cascading style sheet (CSS) code, etc.) associated with messages, tags within the code (e.g., a div tag, an image tag, text-related tags, etc.), and/or the like associated with the messages.

In some implementations, by processing the code, tags within the code, and/or the like, the fraud analysis platform may be capable of identifying text within the message, images within the message, a likelihood that an image includes a confirmation, and/or the like. For example, the fraud analysis platform may be configured with information that identifies a hierarchy of the code associated with the message (e.g., the code may be structured in a hierarchical manner that impacts execution of the code, tags associated with the code may have a hierarchical structure to organize information in the code and/or to impact a manner in which the information is provided for display, and/or the like).

In some implementations, the fraud analysis platform may scan the hierarchical structure of the code associated with a message to identify a confirmation included in the message, to identify information related to the message, and/or the like. For example, the fraud analysis platform may scan the hierarchical structure of the code to identify text and/or images included in the code. Continuing with the previous example, if the fraud analysis platform identifies an image in the code of the message, then the fraud analysis platform may scan the hierarchical structure (e.g., tags that are at a higher or lower level in the hierarchical structure) to identify information (e.g., text, metadata, etc.) that may be associated with the image. Continuing still with the previous example, the fraud analysis platform may then process the information associated with the image to determine whether the image includes a confirmation (e.g., using a text processing technique to identify terms, phrases, and/or the like included in the information that indicates that the image includes a confirmation).

In some implementations, the fraud analysis platform may obtain one or more template confirmation messages that are associated with one or more merchants known to send confirmation messages. The fraud analysis platform may store the one or more template confirmation messages in a data structure to enable the fraud analysis platform to use the template confirmation message to process the messages of the messaging account. Accordingly, the fraud analysis platform may obtain, from the data structure, the confirmation message for the merchant involved in the transaction and use the template confirmation message to process the messages of the messaging account (e.g., by ignoring messages that do not follow the template and/or recognizing confirmations in messages that do follow the template).

In some implementations, the fraud analysis platform may determine a score that indicates a likelihood that a message includes a confirmation based on a result of processing the message. For example, the fraud analysis platform may use a machine learning model, such as a message analysis model, that has been trained on a training set of data that identifies results of processing messages and corresponding scores indicating a likelihood that the messages include a confirmation. In some implementations, the fraud analysis platform may use the score to identify messages from which to extract confirmations, messages to process, messages to tag, and/or the like, as described elsewhere herein. This conserves processing resources by providing the fraud analysis platform with an efficient way to identify messages that are likely to include a confirmation, thereby reducing a quantity of messages that the fraud analysis platform processes that do not include a confirmation.

Accordingly, the fraud analysis platform may train the message analysis model based on one or more parameters associated with identifying a confirmation in one or more messages, such as a format of a confirmation message, a template of a confirmation message, an image associated with a confirmation message, a field (e.g., a date field, a time field, a transaction amount field, a merchant field, and/or the like) associated with a confirmation message, a type of a confirmation message (e.g., a notification message, a receipt, and/or the like), a merchant associated with a confirmation message, an attachment associated with a confirmation message, and/or the like. The fraud analysis platform may train the message analysis model using historical data associated with identifying confirmations within messages according to the one or more parameters. Using the historical data and the one or more parameters as inputs to the message analysis model, the fraud analysis platform may determine that a message is a confirmation message or that a message is not a confirmation message in order to determine whether a messaging account includes a confirmation message for a transaction.

In some implementations, the fraud analysis platform may perform batch processing of the messages in the messaging account in order to determine whether the messaging account includes a confirmation message. For example, the fraud analysis platform may process a first batch of messages based on receiving the notification of the transaction from the transaction platform. The first batch may correspond to the set of messages received between the time of the transaction and a first time after the transaction (e.g., 5 minutes, 10 minutes, 30 minutes, 60 minutes, and/or the like). If the fraud analysis platform determines that the first batch of messages does not include a confirmation message for the transaction, then the fraud analysis platform may process a second batch of messages received between the first time after the transaction and a second time after the transaction (e.g., 15 minutes after the first time, 30 minutes after the first time, 120 minutes after the first time, and/or the like). If the fraud analysis platform determines that the second batch of messages does not include a confirmation message for the transaction, the fraud analysis platform may process a third batch, and so on.

In some implementations, the fraud analysis platform may use a machine learning model, such as a batch processing model, to determine a number of the batches of messages that are to be processed and/or determine lengths of time periods between processing the batches of messages. For example, the fraud analysis platform may train the batch processing model based on one or more parameters associated with the transaction, such as a merchant involved in the transaction, a price associated with the transaction, a product or service involved in the transaction, a type of the transaction (e.g., online or in-person), a type of financial account used in the transaction (e.g., a credit account, a debit account, a member rewards account, and/or the like), a location associated with the transaction, a user involved in the transaction, and/or the like. Additionally, or alternatively, the fraud analysis platform may train the batch processing model based on one or parameters associated with the user involved in the transaction, such as a location associated with the user (e.g., a home address, a work address, a known location of the user, and/or the like), a status of a financial account of the user (e.g., whether the account is in good standing, on hold, and/or the like), a user's purchasing history (e.g., whether the user has made a purchase from the merchant, whether the user has made a purchase for the product or service of the transaction, and/or the like), whether the user has opted in or opted out of receiving confirmation messages for transactions for the merchant, and/or the like. Additionally, or alternatively, the fraud analysis platform may train the batch processing model based on one or more parameters associated with the messaging account, such as a type of the messaging account, a service provider associated with the messaging account, a format of the messaging account, and/or the like. The fraud analysis platform may train the batch processing model using historical data associated with determining the number of batches and/or the time periods between processing the batches according to the one or more parameters associated with the transaction, the one or more parameters associated with the user, and/or the one or more parameters associated with the messaging account. Using the historical data and these parameters as inputs to the batch processing model, the fraud analysis platform may perform batch processing of the messages in the messaging account to determine whether the messaging account received a confirmation message for the transaction.

As described herein, the time periods associated with analyzing messages of the messaging account may enable relatively quick detection of potential fraud relative to previous techniques. For example, whereas previous fraud analysis techniques that do not involve analyzing a message account for a confirmation message associated with a transaction may take days, weeks, or more, such time periods may be set to determine a likelihood of fraud within minutes and/or hours, thus decreasing the amount of data associated with analyzing transactions that are likely fraudulent (as less time between analyses is needed to determine the likelihood of fraud).

In this way, by batch processing the messages of the messaging account, the fraud analysis platform may conserve computing resources and/or network resources by accessing the server device at certain times to process the messages, rather than continuously using computing resources and/or network resources to monitor the messaging account for received messages.

As further shown in FIG. 1A, and by reference number 140, an example is shown of the fraud analysis platform identifying messages that are likely to include a confirmation. For example, and as further shown, the fraud analysis platform may identify a source of the messages (e.g., shown as "a@b.com" for Message 1 and "x@y.com" for Message 2), terms and/or phrases included in the messages (e.g., shown as "Receipt for transaction on 10/12/2018," for Message 1 and "Hi!," and "how are you?" for Message 2).

In some implementations, the terms and/or phrases identified for Message 1 may indicate that the message includes a confirmation, and the terms and/or phrases identified for Message 2 may indicate that the message does not include a confirmation, that Message 2 is personal in nature, and/or the like. In some implementations, the fraud analysis platform may determine a score for a message based on the information identified in the message, as described herein.

In some implementations, the fraud analysis platform may determine whether a score for a message satisfies a threshold. For example, and with regard to the two messages associated with reference number 140, the fraud analysis platform may determine that a score for Message 1 satisfies a threshold and that the score for Message 2 does not satisfy a threshold. In some implementations, the fraud analysis platform may extract information from a message when the score associated with the message satisfies a threshold. For example, and referencing the messages associated with reference number 140, the fraud analysis platform may extract information related to a confirmation included in Message 1. Such information may include a time and/or date associated with a transaction identified in the confirmation, a merchant associated with the transaction identified in the confirmation, a product and/or service identified in the confirmation, and/or the like.

Additionally, or alternatively, based on the score for Message 2 not satisfying the threshold, the fraud analysis platform may not extract any information from Message 2, may tag Message 2 with information identifying that Message 2 is not to be processed in the future, and/or the like. This may conserve processing resources of the fraud analysis platform by reducing or eliminating future processing of particular messages. In addition, the information used to tag the messages as personal in nature may be recognized by other platforms, thereby increasing a privacy of the messages by causing the other platforms to not process messages tagged in that manner and/or conserving processing resources of the other platforms by reducing a quantity of messages that the other platforms are required to process.

In this way, the fraud analysis platform may process the messages in the messaging account to determine whether a confirmation message associated with the transaction was received in the message account in order to enable the fraud analysis platform to determine a probability that the transaction was fraudulent.

As shown in FIG. 1B, and by reference number 150, the fraud analysis platform determines a likelihood (e.g., a probability) that the transaction is fraudulent based on the processed messages. As described herein, the processed messages may include messages received by the messaging account after the time of the transaction (e.g., which may have been identified in the notification that the transaction occurred). The fraud analysis platform may determine the likelihood of the transaction being fraudulent based on whether any of the processed messages is a confirmation message for the transaction (e.g., based on whether any of the processed messages included a confirmation for the transaction). If the fraud analysis platform determines that one or more of the processed messages is a confirmation message of the transaction, the fraud analysis platform may determine that the transaction is less likely to be fraudulent. If the fraud analysis platform determines that none of the processed messages is a confirmation message for the transaction, the fraud analysis platform may determine that the transaction is more likely to be fraudulent.

In some implementations, the fraud analysis platform may determine that if the messaging account failed to receive a confirmation message (or does not include a confirmation message) after a threshold time period (e.g., five minutes, fifteen minutes, an hour, two hours, and/or the like) or within a threshold number of messages, then the messaging account is not likely to receive a confirmation message for the transaction, and may cease analyzing the messaging account for a confirmation message for the transaction. In such cases, the fraud analysis platform may perform a fraud analysis of the transaction based on the failure to receive a confirmation message. Further, if the fraud analysis platform determines that the messaging account likely should have received a confirmation message for the transaction (e.g., because it is likely that a merchant associated with the transaction would have provided a confirmation message to the messaging account), then the fraud analysis platform may determine that the transaction is more likely fraudulent.

In some implementations, the fraud analysis platform may train a machine learning model, such as a threshold analysis model, to determine a duration of the threshold time period. The threshold analysis model may be trained in a similar manner as the batch processing model (e.g., using one or more of the parameters and/or historical data associated with the batch processing model). For example, the fraud analysis platform may train the threshold analysis model using the one or more parameters associated with the transaction, the one or more parameters associated with the user, and/or the one or more parameters associated with the messaging account, along with historical data for determining a threshold time period according to those parameters. Those parameters and that historical data may further be used as inputs to the threshold analysis model to determine the duration of the threshold time period associated with monitoring for a confirmation message for a transaction and/or to identify a time after which it is unlikely that the messaging account is going to receive a confirmation message for the transaction.

The fraud analysis platform may determine a score, for a fraud analysis of a transaction, that is based on whether a messaging account receives a confirmation message for the transaction. The score may indicate a likelihood that the transaction is fraudulent, based on no confirmation message associated with the transaction being received in a messaging account of a user associated with the transaction. In some implementations, the score may be used as part of a detailed fraud analysis of the transaction that includes one or more other examinations of the transaction to determine an overall probability that the transaction was fraudulent.

In some implementations, the fraud analysis platform may train a machine learning model, such as a messaging account-based fraud analysis model, to determine a likelihood that the transaction is fraudulent based on the processed messages not including a confirmation message. For example, the fraud analysis platform may train the messaging account model based on one or more parameters associated with determining a likelihood that a confirmation message should have been received by the messaging account within the threshold time period (or included within the processed messages). Such parameters may correspond to the one or more parameters associated with the transaction, the one or more parameters associated with the user, and/or the one or more parameters associated with the messaging account, as described above in connection with the batch processing model and/or threshold analysis model. The fraud analysis platform may train the messaging account-based fraud analysis model using historical data associated with determining a likelihood that a transaction is fraudulent based on one or more messaging accounts (e.g., the user's messaging account or another user's messaging account) not including a confirmation message for one or more transactions (e.g., one or more transactions involving the user or other users, one or more transactions involving the merchant or other merchants, and/or the like) according to the one or more parameters associated with determining the likelihood that a confirmation message should have been received by the messaging account. Using the historical data and these parameters as inputs to the messaging account-based fraud analysis model, the fraud analysis platform may determine a likelihood that the transaction is fraudulent.

Accordingly, the fraud analysis platform may determine, more quickly relative to previous fraud analyses, that a transaction is likely fraudulent, thus decreasing the amount of data needed to process a fraud analysis for each transaction (e.g., as less transactions may be queued between delays in detecting likely fraudulent transactions).

In this way, the fraud analysis platform may quickly determine a likelihood that the transaction is fraudulent in order to permit the fraud analysis platform to perform an action associated with a financial account of the user.

As shown in FIG. 1C, and by reference numbers 160a, 160b, 160c, and 160d the fraud analysis platform may perform one or more actions based on the determined likelihood that the transaction was fraudulent.

As shown by reference number 160a, the fraud analysis platform may flag the financial account used in the transaction. For example, the fraud analysis platform may flag the financial account to prevent any future transactions involving the financial account. As shown in FIG. 1C, the fraud analysis platform may flag the financial account of the user that is maintained by an account platform associated with the financial institution. Accordingly, the fraud analysis platform may freeze or place a hold on the financial account to prevent any additional, potential fraudulent transactions from occurring (e.g., until an investigation into whether the financial account has been compromised is performed).

In some implementations, the fraud analysis platform may flag the merchant involved in the transaction. For example, the merchant may be flagged to prevent any further transactions involving any financial account of a financial institution and the merchant. Additionally, or alternatively, one or more other merchants in a same category of the merchant (e.g., in a same location, in a same industry, and/or the like) may be flagged to prevent any further transactions involving the one or more other merchants.

As shown by reference number 160b, the fraud analysis platform may notify authorities of potential fraud. The authorities may include a fraud investigation entity of a financial institution, a law enforcement agency, and/or the like. As shown in FIG. 1C, the fraud analysis platform may notify (e.g., via a notification message that includes information associated with the transaction) a fraud investigation platform of the potential fraudulent transaction. Through such a notification, the fraud analysis platform may cause the fraud investigation platform to open an investigation (e.g., to notify one or more human investigators of the potential fraud) associated with the transaction and/or the financial account used in the transaction.

As shown by reference number 160c, the fraud analysis platform may notify the user of potential fraud. For example, the fraud analysis platform may initiate a phone call to the user device, send a text message to the user device, send an alert to the user device, and/or the like. The fraud analysis platform may notify the user via a notification message (e.g., in the phone call, text message or alert) that indicates that the transaction was likely fraudulent and/or that the financial account used in the transaction may have been compromised by an unauthorized user. In some implementations, if the financial account has been frozen or placed on hold, the notification may indicate the same to the user. In some implementations, the fraud analysis platform may notify the user via the messaging account by sending a message to the server device that maintains the messaging account. In such cases, the user may be notified when accessing messages of the messaging account.

In some implementations, the fraud analysis platform may send a request to the user (e.g., via the user device and/or the messaging account on the server device) to verify that the transaction was authorized. For example, the fraud analysis platform may send a prompt to the user to indicate whether the transaction was authorized or fraudulent (e.g., based on the user's knowledge). The user may enter a response that indicates whether or not the user believes the transaction was authorized, and, thus, the fraud analysis platform may receive an indication of whether the transaction was fraudulent. In some implementations, the fraud analysis platform may train a machine learning model, such as the messaging account-based fraud analysis model, based on the response from the user.

As shown by reference number 160d, the fraud analysis platform may perform a detailed fraud analysis. For example, the fraud analysis platform may perform the detailed fraud analysis based on determining that the messaging account does not include a confirmation message (e.g., within a threshold time period). During the detailed fraud analysis, the fraud analysis platform may perform any other suitable examination of the transaction to determine whether the transaction was fraudulent. For example, the fraud analysis platform may perform an analysis of a number of transactions that occurred within a recent time period (e.g., to detect whether a threshold number of transactions (e.g., five transactions, ten transactions, and/or the like) occurred with the recent time period, indicating a likely fraudulent transaction) using the financial account in the transaction, a location-based analysis of the transaction and the user, timing associated with the transaction, an analysis of a transaction history associated with the financial account, an analysis of fraud history associated with the merchant, products, and/or services of the transaction, and/or the like. In some implementations, the detailed fraud analysis may include contacting the user to request an indication of the user's knowledge with respect to the transaction being fraudulent, as described in connection with reference number 160c. Additionally, or alternatively, the detailed fraud analysis may include contacting one or more other users that have been involved in transactions with the merchant to determine whether the merchant is associated with fraudulent transactions. In some implementations, if the fraud analysis platform determines that the messaging account does include a confirmation message, the fraud analysis platform may end or forgo the detailed fraud analysis, may bypass one or more examinations of the fraud analysis, and/or the like. Accordingly, the fraud analysis platform may conserve any computing resources and/or network resources that may have otherwise been wasted performing the detailed fraud analysis and/or the bypassed examinations of the fraud analysis.

In some implementations, the fraud analysis platform may train a machine learning model, such as a fraud analysis model, that is used by the fraud analysis platform to detect fraudulent transactions. For example, the fraud analysis platform may train the fraud analysis model based on one or more parameters associated with detecting that the transaction was fraudulent, such as whether the transaction was determined to be fraudulent based on the messaging account not receiving a confirmation message, one or more parameters associated with the transaction, one or more parameters associated with the user, and/or the like. The fraud analysis platform may train the machine learning model using historical data associated with detecting fraudulent transactions according to the one or more parameters. Using the historical data and the one or more parameters as inputs to the fraud analysis model, the fraud analysis platform may detect whether a transaction is fraudulent, in order to protect funds of a user and/or financial institution, investigate an unauthorized user, and/or prevent future transactions associated with the financial account.

Accordingly, based on whether the messaging account received a confirmation message associated with a transaction, the fraud analysis platform may perform one or more actions associated with the financial account and/or the fraud analysis platform.

In this way, the fraud analysis platform of example implementation 100 may monitor a user's messaging account (with the user's consent) to determine whether a transaction is fraudulent based on whether a confirmation message associated with the transaction was received within a threshold time period. If a confirmation message was received, the fraud analysis platform may determine that the transaction was not fraudulent. Alternatively, if a confirmation message was not received (e.g., within a threshold time period), the fraud analysis platform may determine that the transaction was potentially or likely fraudulent. Further, as described herein, the fraud analysis platform may perform one or more actions based on whether a messaging account receives a confirmation message associated with a transaction.

Accordingly, the fraud analysis platform, as described herein, may decrease an amount of time to determine that a transaction is potentially fraudulent, thus decreasing the amount of computing resources and/or network resources needed to detect that the transaction was potentially fraudulent. Further, the fraud analysis platform, as described herein, may increase a likelihood of recovering any lost funds from the transaction if the transaction is fraudulent. Therefore, the fraud analysis platform may conserve financial resources of a user (which may improve a customer experience with respect to managing a fraudulent transaction) and/or financial institution.

As indicated above, FIGS. 1A-1C are provided merely as an example. Other examples may differ from what is described with regard to FIGS. 1A-1C.

Figure 2:
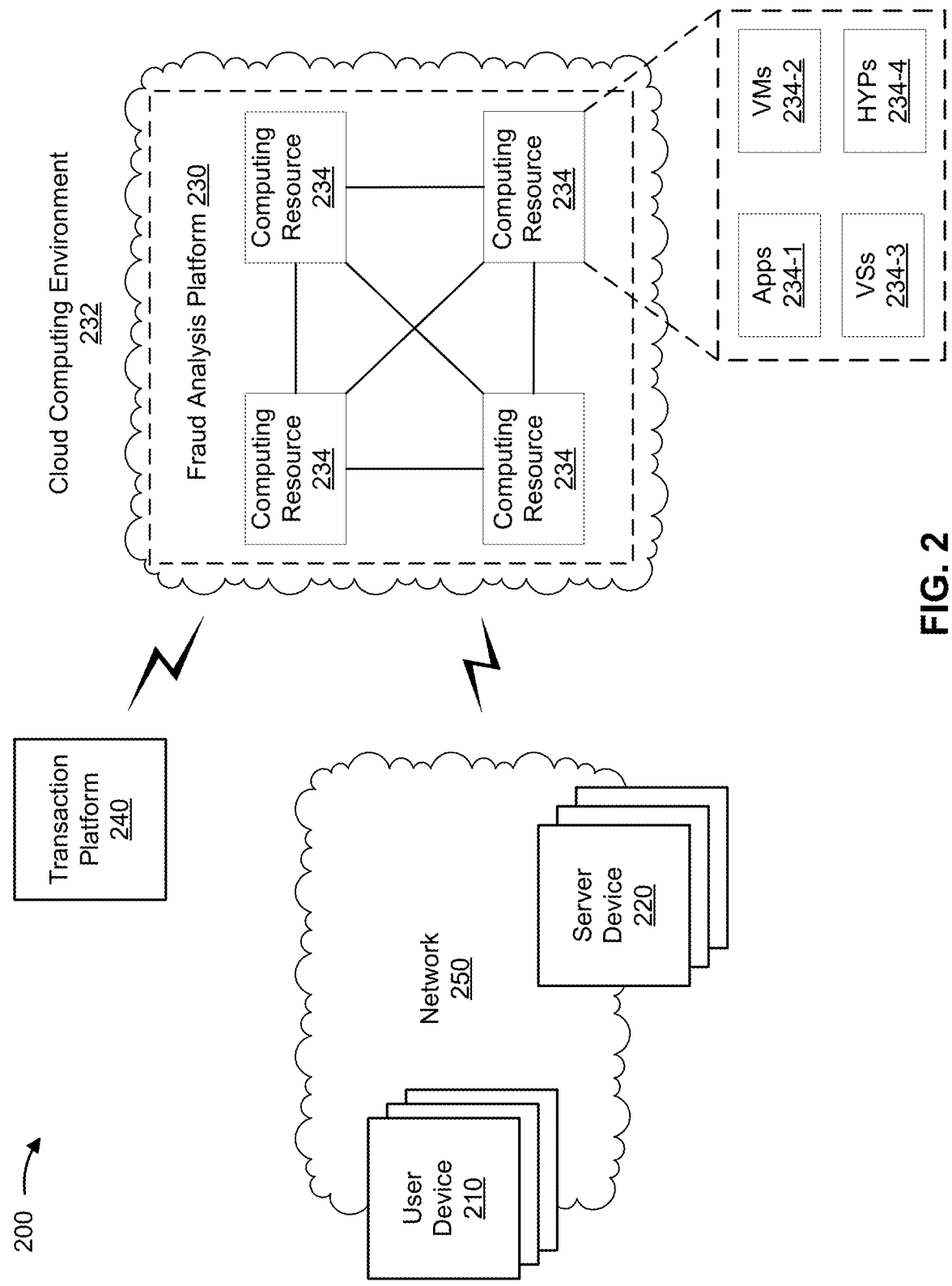
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, a fraud analysis platform 230 hosted within a cloud computing environment 232, a computing resource 234, a transaction platform 240, and a network 250. Devices of environment 200 may interconnect via wired connections, wireless connections, or a combination of wired and wireless connections.

User device 210 includes one or more devices capable of receiving, generating, storing, processing, and/or providing information associated with determining whether a transaction was fraudulent based on processing one or more messages of a messaging account and/or determining whether the messaging account received a confirmation message associated with the transaction. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide, to fraud analysis platform 230, access information (e.g., that permits fraud analysis platform 230 to access a messaging account hosted on server device 220), may receive a notification (e.g., a phone call, a text message, an alert, and/or the like) of potential fraud from fraud analysis platform 230, and/or the like.

Server device 220 includes one or more devices capable of storing, processing, and/or routing information associated with fraud detection based on an analysis of messages in a messaging account. For example, server device 220 may store and/or maintain a messaging account (e.g., an email account, a text message account, an instant message account, and/or the like) that includes messages that may be analyzed by fraud analysis platform 230, as described herein. In some implementations, server device 220 may include a communication interface that allows server device 220 to receive information from and/or transmit information to other devices in environment 200.

Fraud analysis platform 230 includes one or more computing resources assigned to perform a fraud analysis based on processing one or more messages in a messaging account. For example, fraud analysis platform 230 may be a platform implemented by cloud computing environment 232 that may analyze messages in a messaging account (e.g., stored and/or maintained by server device 220) to determine a likelihood of a transaction being fraudulent based on whether a confirmation message associated with the transaction was received in the messaging account.

Fraud analysis platform 230 may include a server device or a group of server devices. In some implementations, fraud analysis platform 230 may be hosted in cloud computing environment 232. Notably, while implementations described herein describe fraud analysis platform 230 as being hosted in cloud computing environment 232, in some implementations, fraud analysis platform 230 may be non-cloud-based or may be partially cloud-based.

Cloud computing environment 232 includes an environment that delivers computing as a service, whereby shared resources, services, etc. may be provided to perform fraud detection. Cloud computing environment 232 may provide computation, software, data access, storage, and/or other services that do not require end-user knowledge of a physical location and configuration of a system and/or a device that delivers the services. As shown, cloud computing environment 232 may include fraud analysis platform 230 and computing resource 234.

Computing resource 234 includes one or more personal computers, workstation computers, server devices, or another type of computation and/or communication device. In some implementations, computing resource 234 may host fraud analysis platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, virtualized storage ("VSs") 234-3, one or more hypervisors ("HYPs") 234-4, or the like.

Application 234-1 includes one or more software applications that may be provided to or accessed by user device 210. Application 234-1 may eliminate a need to install and execute the software applications on user device 210. For example, application 234-1 may include software associated with fraud analysis platform 230 and/or any other software capable of being provided via cloud computing environment 232. In some implementations, one application 234-1 may send/receive information to/from one or more other applications 234-1, via virtual machine 234-2. In some implementations, one or more applications 234-1 may include one or more machine learning models described herein.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program and may support a single process. In some implementations, virtual machine 234-2 may execute on behalf of a user (e.g., user device 210), and may manage infrastructure of cloud computing environment 232, such as data management, synchronization, or long-duration data transfers. In some implementations, virtual machine 234-2 may execute and/or implement one or more machine learning models, as described herein.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems and may manage the execution of the guest operating systems. Multiple instances of a variety of operating systems may share virtualized hardware resources.

Transaction platform 240 includes one or more devices capable of receiving, generating, storing, processing, and/or providing information associated with a transaction and/or one or more devices capable of authorizing and/or facilitating a transaction. For example, transaction platform 240 may include one or more server devices and/or computing devices to store and/or provide information associated with processing a transaction and may be associated with one or more merchants. In some implementations, transaction platform 240 may notify fraud analysis platform 230 that a transaction occurred. Transaction platform 240 may provide information associated with the transaction to permit fraud analysis platform 230 to process messages of a messaging account maintained by server device 220 in order to determine whether a confirmation message associated with the transaction was received by the messaging account.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
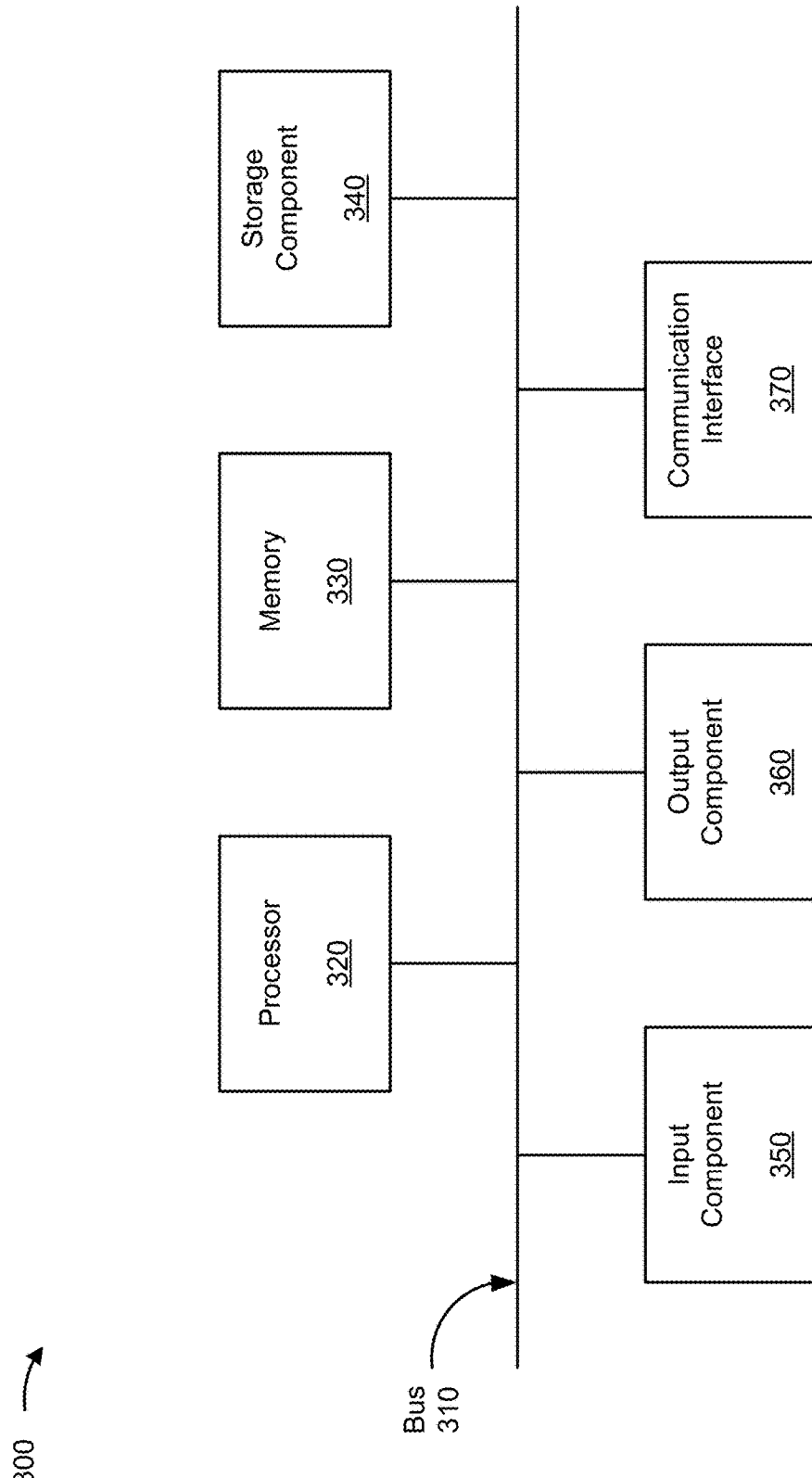
FIG. 3 is a diagram of example components of one or more devices of FIG. 2.

FIG. 3 is a diagram of example components of a device 300. Device 300 may correspond to user device 210, server device 220, fraud analysis platform 230, computing resource 234, and/or transaction platform 240. In some implementations, user device 210, server device 220, fraud analysis platform 230, computing resource 234, and/or transaction platform 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-;state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for fraud detection based on an analysis of received messages associated with a user. In some implementations, one or more process blocks of FIG. 4 may be performed by a fraud analysis platform (e.g. fraud analysis platform 230). In some implementations, one or more process blocks of FIG. 4 may be performed by another device or a group of devices separate from or including fraud analysis platform (e.g. fraud analysis platform 230), such as a user device (e.g. user device 210), a server device (e.g. server device 220) a computing resource (e.g. computing resource 234), and a transaction platform (e.g. transaction platform 240).

As shown in FIG. 4, process 400 may include obtaining a notification that a transaction occurred, wherein the transaction is associated with a financial account of a user, and a merchant (block 410). For example, the fraud analysis platform (e.g., using computing resource 234, processor 320, memory 330, storage component 340, input component 350, communication interface 370, and/or the like) may obtain a notification that a transaction occurred, as described above. In some implementations, the transaction is associated with a financial account of a user, and a merchant.

As further shown in FIG. 4, process 400 may include determining that the merchant is associated with providing confirmation messages for transactions (block 420). For example, the fraud analysis platform (e.g., using computing resource 234, processor 320, memory 330, storage component 340, and/or the like) may determine that the merchant is associated with providing confirmation messages for transactions, as described above.

As further shown in FIG. 4, process 400 may include processing, based on determining that the merchant is associated with providing confirmation messages, one or more messages in a messaging account associated with the user to determine whether the messaging account includes a confirmation message associated with the transaction (block 430). For example, the fraud analysis platform (e.g., using computing resource 234, processor 320, memory 330, storage component 340, and/or the like) may process, based on determining that the merchant is associated with providing confirmation messages, one or more messages in a messaging account associated with the user to determine whether the messaging account includes a confirmation message associated with the transaction, as described above.

As further shown in FIG. 4, process 400 may include determining that the messaging account does not include any confirmation message associated with the transaction (block 440). For example, the fraud analysis platform (e.g., using computing resource 234, processor 320, memory 330, storage component 340, and/or the like) may determine that the messaging account does not include any confirmation message associated with the transaction, as described above.

As further shown in FIG. 4, process 400 may include determining a likelihood that the transaction was unauthorized based on the messaging account not including a confirmation message (block 450). For example, the fraud analysis platform (e.g., using computing resource 234, processor 320, memory 330, storage component 340, and/or the like) may determine a likelihood that the transaction was unauthorized based on the messaging account not including a confirmation message, as described above.

As further shown in FIG. 4, process 400 may include performing an action associated with the financial account of the user based on the likelihood that the transaction was unauthorized (block 460). For example, the fraud analysis platform (e.g., using computing resource 234, processor 320, memory 330, storage component 340, input component 350, output component 360, communication interface 370, and/or the like) may perform an action associated with the financial account of the user based on the likelihood that the transaction was unauthorized, as described above.

Process 400 may include additional implementations, such as any single implementation or any combination of implementations described below and/or in connection with one or more other processes described elsewhere herein.

In some implementations, the one or more messages may have been received in the messaging account within a threshold time period after the transaction. In some implementations, when determining that the merchant is associated with providing confirmation messages for transactions, the fraud analysis platform may identify a previous confirmation message in the messaging account, where the previous confirmation message is associated with a previous transaction between the merchant and the user and may determine that the merchant is associated with providing confirmation messages based on the previous confirmation message.

In some implementations, the fraud analysis platform may receive access information that permits access to the messaging account. In some implementations, when performing the action, the fraud analysis platform may send a request to a user device in order to permit the user to verify whether the transaction was authorized, may receive an indication of whether the transaction was authorized, and may train a fraud analysis model based on the indication of whether the transaction was authorized and information associated with the transaction.

In some implementations, when performing the action, the fraud analysis platform may send a notification message that includes at least one of a request to the user to permit the user to verify that the transaction was authorized, an indication that the transaction was likely unauthorized, or an indication that information associated with the financial account has likely been compromised by an unauthorized user. In some implementations, when performing the action, the fraud analysis platform may prevent any future transactions associated with the financial account or may flag the financial account as potentially compromised by an unauthorized user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for fraud detection based on an analysis of received messages associated with a user. In some implementations, one or more process blocks of FIG. 5 may be performed by a fraud analysis platform (e.g. fraud analysis platform 230). In some implementations, one or more process blocks of FIG. 5 may be performed by another device or a group of devices separate from or including a fraud analysis platform (e.g. fraud analysis platform 230), such as a user device (e.g. user device 210), a server device (e.g. server device 220) a computing resource (e.g. computing resource 234), and a transaction platform (e.g. transaction platform 240).

As shown in FIG. 5, process 500 may include receiving access information that permits access to messages associated with a messaging account of a user (block 510). For example, the fraud analysis platform (e.g., using computing resource 234, processor 320, memory 330, storage component 340, input component 350, communication interface 370, and/or the like) may receive access information that permits access to messages associated with a messaging account of a user, as described above.

As further shown in FIG. 5, process 500 may include obtaining a notification that a transaction occurred, wherein the transaction is associated with a financial account of the user and a merchant (block 520). For example, the fraud analysis platform (e.g., using computing resource 234, processor 320, memory 330, storage component 340, input component 350, communication interface 370, and/or the like) may obtain a notification that a transaction occurred, as described above. In some implementations, the transaction is associated with a financial account of the user and a merchant.

As shown in FIG. 5, process 500 may include determining that the merchant provided a previous confirmation message for a previous transaction between the user and the merchant (block 530). For example, the fraud analysis platform (e.g., using computing resource 234, processor 320, memory 330, storage component 340, and/or the like) may determine that the merchant provided a previous confirmation message for a previous transaction between the user and the merchant, as described above.

As further shown in FIG. 5, process 500 may include processing, based on determining that the merchant provided the previous confirmation message, a first set of the messages in the messaging account to identify whether the first set of the messages includes a confirmation associated with the transaction, wherein the first set of the messages were received in the messaging account within a first threshold time period after the transaction (block 540). For example, the fraud analysis platform (e.g., using computing resource 234, processor 320, memory 330, storage component 340, and/or the like) may process, based on determining that the merchant provided the previous confirmation message, a first set of the messages in the messaging account to identify whether the first set of the messages includes a confirmation associated with the transaction, as described above. In some implementations, the first set of the messages were received in the messaging account within a first threshold time period after the transaction.

As shown in FIG. 5, process 500 may include determining that the first set of the messages does not include a confirmation associated with the transaction based on processing the first set of messages (block 550). For example, the fraud analysis platform (e.g., using computing resource 234, processor 320, memory 330, storage component 340, and/or the like) may determine that the first set of the messages does not include a confirmation associated with the transaction based on processing the first set of messages, as described above.

As shown in FIG. 5, process 500 may include performing an action based on determining that the first set of the messages does not include a confirmation associated with the transaction (block 560). For example, the fraud analysis platform (e.g., using computing resource 234, processor 320, memory 330, storage component 340, input component 350, output component 360, communication interface 370, and/or the like) may perform an action based on determining that the first set of the messages does not include a confirmation associated with the transaction, as described above.

Process 500 may include additional implementations, such as any single implementation or any combination of implementations described below and/or in connection with one or more other processes described elsewhere herein.

In some implementations, the first set of the messages may be processed using at least one of an image processing technique, a text processing technique, or a code processing technique. In some implementations, the confirmation may include a receipt associated with the transaction. In some implementations, when processing the first set of the messages, the fraud analysis platform may receive a template confirmation message associated with the merchant and may process the first set of the messages to identify, based on the template confirmation message, whether the first set of the messages includes a confirmation message. In some implementations, the fraud analysis platform may determine a likelihood that the transaction is fraudulent based on a characteristic of the transaction and may process the first set of the messages based on the likelihood that the transaction is fraudulent.

In some implementations, when performing the action, the fraud analysis platform may, after the first threshold time period, process a second set of the messages to identify whether the second set of the messages includes a confirmation associated with the transaction, where the second set of the messages were received by the messaging account within a second threshold time period that expires after the first threshold time period, may determine whether the second set of the messages includes a message with a confirmation associated with the transaction, and may perform a further action associated with the financial account based on whether the second set of the messages includes a message with a confirmation associated with the transaction. In some implementations, when performing the further action, the fraud analysis platform may prevent any future transactions associated with the financial account or may flag the financial account as potentially compromised by an unauthorized user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for fraud detection based on an analysis of received messages associated with a user. In some implementations, one or more process blocks of FIG. 6 may be performed by a fraud analysis platform (e.g. fraud analysis platform 230). In some implementations, one or more process blocks of FIG. 6 may be performed by another device or a group of devices separate from or including fraud analysis platform (e.g. fraud analysis platform 230), such as a user device (e.g. user device 210), a server device (e.g. server device 220) a computing resource (e.g. computing resource 234), and a transaction platform (e.g. transaction platform 240).

As shown in FIG. 6, process 600 may include detecting that a transaction occurred, wherein the transaction is associated with a financial account of a user and a merchant (block 610). For example, the fraud analysis platform (e.g., using computing resource 234, processor 320, memory 330, storage component 340, input component 350, communication interface 370, and/or the like) may detect that a transaction occurred, as described above. In some implementations, the transaction is associated with a financial account of a user and a merchant.

As further shown in FIG. 6, process 600 may include determining that the merchant is associated with providing confirmation messages for transactions (block 620). For example, the fraud analysis platform (e.g., using computing resource 234, processor 320, memory 330, storage component 340, and/or the like) may determine that the merchant is associated with providing confirmation messages for transactions, as described above.

As shown in FIG. 6, process 600 may include monitoring, by the device and based on determining that the merchant is associated with providing confirmation messages for transactions, a messaging account to determine whether the messaging account receives a confirmation message associated with the transaction, wherein the monitoring is based on detecting the transaction (block 630). For example, the fraud analysis platform (e.g., using computing resource 234, processor 320, memory 330, storage component 340, input component 350, communication interface 370, and/or the like) may monitor, by the device and based on determining that the merchant is associated with providing confirmation messages for transactions, a messaging account to determine whether the messaging account receives a confirmation message associated with the transaction, as described above. In some implementations, the monitoring is based on detecting the transaction.

As further shown in FIG. 6, process 600 may include determining whether the messaging account received a confirmation message within a threshold time period associated with the transaction (block 640). For example, the fraud analysis platform (e.g., using computing resource 234, processor 320, memory 330, storage component 340, and/or the like) may determine whether the messaging account received a confirmation message within a threshold time period associated with the transaction, as described above.

As shown in FIG. 6, process 600 may include performing an action based on whether the user failed to receive a confirmation message within the threshold time period (block 650). For example, the fraud analysis platform (e.g., using computing resource 234, processor 320, memory 330, storage component 340, input component 350, output component 360, communication interface 370, and/or the like) may perform an action based on whether the user failed to receive a confirmation message within the threshold time period, as described above.

Process 600 may include additional implementations, such as any single implementation or any combination of implementations described below and/or in connection with one or more other processes described elsewhere herein.

In some implementations, the fraud analysis platform may identify a characteristic of the transaction that indicates that the transaction is potentially fraudulent, where the monitoring is further based on identifying the characteristic. In some implementations, when determining that the merchant is associated with providing confirmation messages, the fraud analysis platform may identify that the merchant has provided a previous confirmation message for a previous transaction, and may determine, based on identifying that the merchant provided the previous confirmation message, that the merchant is associated with providing confirmation messages. In some implementations, the fraud analysis platform may determine a probability that the transaction is fraudulent based on determining that the messaging account did not receive a confirmation message associated with the transaction.

In some implementations, when performing the action, the fraud analysis platform may flag the financial account to prevent a future transaction associated with the financial account when the messaging account is determined to not include a confirmation message associated with the transaction or may perform a fraud analysis when the messaging account is determined to include a confirmation message associated with the transaction. In some implementations, when performing action, the fraud analysis platform may send a notification to the messaging account when the messaging account is determined to not include a confirmation message associated with the transaction, where the notification indicates that the transaction occurred, and/or a likelihood of fraudulent activity associated with the financial account.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, configured to:
receive access information that permits access to messages associated with a messaging account of a user;
obtain a notification that a transaction occurred,
wherein the transaction is associated with:
a financial account of the user, and
a merchant;
determine that the merchant is associated with providing confirmation messages for transactions;
pre-process a plurality of messages in the messaging account, based on determining that the merchant is associated with providing confirmation messages and based on one or more characteristics of the messages and one or more characteristics of the transaction, to filter at least one message from the plurality of messages and identify one or more messages, of the plurality of messages, for further processing;
process, based on the access information and the pre-processing, the one or more messages to determine whether the messaging account includes a confirmation message,
wherein the one or more messages were received in the messaging account within a first threshold time period after the transaction, and
wherein the one or more messages are processed using at least one technique,
wherein the at least one technique includes one or more of:
an image processing technique that comprises at least one of:
an optical character recognition technique, or
a computer vision technique,
a text processing technique that comprises a natural language processing technique, or
a code processing technique that comprises analyzing computer code associated with the confirmation message;
determine, based on processing the one or more messages using the at least one technique, that the messaging account does not include any confirmation message associated with the transaction;
determine a likelihood that the transaction was unauthorized based on the messaging account not including the confirmation message; and
perform an action associated with the financial account of the user based on the likelihood that the transaction was unauthorized.

2. The device of claim 1, wherein the one or more processors, when determining that the merchant is associated with providing confirmation messages for transactions, are configured to:
identify a previous confirmation message in the messaging account,
wherein the previous confirmation message is associated with a previous transaction between the merchant and the user; and
determine that the merchant is associated with providing confirmation messages based on the previous confirmation message.

3. The device of claim 1, wherein the one or more processors, when performing the action, are configured to:
send a request to a user device to permit the user to verify whether the transaction was authorized;
receive an indication of whether the transaction was authorized; and
train a fraud analysis model based on the indication of whether the transaction was authorized and information associated with the transaction.

4. The device of claim 1, wherein the one or more processors, when performing the action, are configured to:
send a notification message that includes at least one of:
a request to the user to permit the user to verify that the transaction was authorized;
an indication that the transaction was likely unauthorized; or
an indication that information associated with the financial account has likely been compromised by an unauthorized user.

5. The device of claim 1, wherein the one or more processors, when performing the action, are configured to at least one of:
prevent any future transactions associated with the financial account, or
flag the financial account as potentially compromised by an unauthorized user.

6. A non-transitory computer-readable medium storing instructions, the instructions comprising:
one or more instructions that, when executed by one or more processors, cause the one or more processors to:
receive access information that permits access to messages associated with a messaging account of a user;
obtain a notification that a transaction occurred,
wherein the transaction is associated with:
a financial account of the user, and
a merchant;
determine that the merchant provided a previous confirmation message for a previous transaction between the user and the merchant;
pre-process a plurality of messages in the messaging account, based on determining that the merchant is associated with providing confirmation messages and based on one or more characteristics of the messages and one or more characteristics of the transaction, to filter at least one message from the plurality of messages and identify a first set of messages, of the plurality of messages, for further processing;
process, based on the access information and based on the pre-processing, the first set of the messages in the messaging account to identify whether the first set of the messages includes a confirmation message,
wherein the first set of the messages were received in the messaging account within a first threshold time period after the transaction, and
wherein the first set of the messages are processed using at least one technique,
wherein the at least one technique includes one or more of:
an image processing technique that comprises at least one of:
an optical character recognition technique, or
a computer vision technique,
a text processing technique that comprises a natural language processing technique, or
a code processing technique that comprises analyzing computer code associated with the confirmation message;
determine, based on processing the first set of the messages using the at least one technique, that the first set of the messages does not include the confirmation message based on processing the first set of the messages;
determine a likelihood that the transaction was unauthorized based on the messaging account not including the confirmation message; and
perform an action associated with the financial account of the user based on determining the likelihood that the transaction was unauthorized.

7. The non-transitory computer-readable medium of claim 6, wherein the confirmation message comprises a receipt associated with the transaction.

8. The non-transitory computer-readable medium of claim 6, wherein the one or more instructions, that cause the one or more processors to process the first set of the messages, further cause the one or more processors to:
receive a template confirmation message associated with the merchant; and
process the first set of the messages to identify, based on the template confirmation message, whether the first set of the messages includes the confirmation message.

9. The non-transitory computer-readable medium of claim 6, wherein the one or more instructions, when executed by the one or more processors, further cause the one or more processors to:
determine a likelihood that the transaction is fraudulent based on a characteristic of the transaction; and
process the first set of the messages based on the likelihood that the transaction is fraudulent.

10. The non-transitory computer-readable medium of claim 6, wherein the one or more instructions, that cause the one or more processors to perform the action, cause the one or more processors to:
after the first threshold time period, process a second set of the messages to identify whether the second set of the messages includes the confirmation message,
wherein the second set of the messages were received by the messaging account within a second threshold time period that expires after the first threshold time period;
determine whether the second set of the messages includes the confirmation message; and
perform a further action associated with the financial account based on whether the second set of the messages includes the confirmation message.

11. The non-transitory computer-readable medium of claim 10, wherein the one or more instructions, that cause the one or more processors to perform the further action, cause the one or more processors to:
prevent any future transactions associated with the financial account, or
flag the financial account as potentially compromised by an unauthorized user.

12. A method, comprising:
receiving, by a device, access information that permits access to messages associated with a messaging account of a user;
detecting, by the device, that a transaction occurred,
wherein the transaction is associated with:
a financial account of the user, and
a merchant;
determining, by the device, that the merchant is associated with providing confirmation messages for transactions;
pre-processing, by the device, a plurality of messages in the messaging account, based on determining that the merchant is associated with providing confirmation messages and based on one or more characteristics of the messages and one or more characteristics of the transaction, to filter at least one message from the plurality of messages and identify one or more messages, of the plurality of messages, for further processing;

monitoring, by the device, based on the access information, the messaging account to determine whether the messaging account receives a confirmation message,
    wherein the monitoring is based on detecting the transaction, and
    wherein the monitoring includes processing, based on the pre-processing, the one or more messages in the messaging account to identify the confirmation message,
    wherein the one or more messages are processed using at least one technique,
        wherein the at least one technique includes one or more of:
            an image processing technique that comprises at least one of:
                an optical character recognition technique, or
                a computer vision technique,
            a text processing technique that comprises a natural language processing technique, or
            a code processing technique that comprises analyzing computer code associated with the confirmation message;
    determining, by the device and based on processing the one or more messages using the at least one technique, whether the messaging account received the confirmation message within a threshold time period associated with the transaction;
determining, by the device, a probability that the transaction is fraudulent based on determining that the messaging account did not receive the confirmation message; and
performing, by the device, an action based on the probability that the transaction is fraudulent.

13. The method of claim 12, further comprising:
    identifying a characteristic of the transaction that indicates that the transaction is potentially fraudulent,
    wherein the monitoring is further based on identifying the characteristic.

14. The method of claim 12, wherein determining that the merchant is associated with providing confirmation messages comprises:
    identifying that the merchant has provided a previous confirmation message for a previous transaction; and
    determining, based on identifying that the merchant provided the previous confirmation message, that the merchant is associated with providing confirmation messages.

15. The method of claim 12, wherein performing the action comprises,
    flagging the financial account to prevent a future transaction associated with the financial account when the messaging account is determined to not include the confirmation message, or
    performing a fraud analysis when the messaging account is determined to include the confirmation message.

16. The method of claim 12, wherein performing the action comprises:
    sending a notification to the messaging account when the messaging account is determined to not include the confirmation message,
    wherein the notification indicates at least one of:
        that the transaction occurred, or
        a likelihood of fraudulent activity associated with the financial account.

17. The method of claim 12, further comprising:
    obtaining, from a data structure and based on the merchant, a template confirmation message; and
    processing the one or more messages comprises:
        processing the one or more messages, using the template confirmation message, to determine whether the messaging account includes the confirmation message.

18. The device of claim 1, wherein the one or more processors are further configured to:
    obtain, from a data structure and based on the merchant, a template confirmation message; and
    the one or more processors, when processing the one or more messages, are configured to:
        process the one or more messages, using the template confirmation message, to determine whether the messaging account includes the confirmation message.

19. The device of claim 1, wherein the one or more processors, when determining that the messaging account does not include any confirmation message, are to:
    determine whether any scores, from a plurality of scores associated with the one or more messages, satisfies a threshold score; and
    determine that the messaging account does not include confirmation message based on no scores, of the plurality of scores, satisfying the threshold score.

20. The non-transitory computer-readable medium of claim 6, wherein the one or more instructions, that cause the one or more processors to determine whether the messaging account received the confirmation message, cause the one or more processors to:
    determine whether any scores, from a plurality of scores associated with the first set of the messages, satisfies a threshold score; and
    determine that the messaging account did not receive the confirmation message based on no scores, of the plurality of scores, satisfying the threshold score.

* * * * *